(12) United States Patent
Inoue (10) Patent No.: US 9,242,513 B2
(45) Date of Patent: Jan. 26, 2016

(54) PNEUMATIC TIRE

(75) Inventor: Harutaka Inoue, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 827 days.

(21) Appl. No.: 13/591,939

(22) Filed: Aug. 22, 2012

(65) Prior Publication Data

US 2013/0048170 A1    Feb. 28, 2013

(30) Foreign Application Priority Data

Aug. 29, 2011  (JP) .................................. 2011-186061

(51) Int. Cl.
| | | |
|---|---|---|
| *B60C 11/12* | (2006.01) | |
| *B60C 11/13* | (2006.01) | |
| *B60C 11/03* | (2006.01) | |

(52) U.S. Cl.
CPC ........... *B60C 11/1376* (2013.04); *B60C 11/032* (2013.04); *B60C 11/1204* (2013.04); *B60C 2011/1254* (2013.04)

(58) Field of Classification Search
CPC   B60C 11/12; B60C 11/1204; B60C 11/1236; B60C 11/1376; B60C 11/1384; B60C 11/1392; B60C 11/032; B60C 2011/1254
USPC .................................................... 152/209.15
See application file for complete search history.

(56) References Cited

U.S. PATENT DOCUMENTS 8,950,453 B2 *   2/2015   Tanno ................... B60C 11/032
                                                              152/209.17

FOREIGN PATENT DOCUMENTS

| DE | 4426950 | * | 2/1996 |
|---|---|---|---|
| EP | 0664230 | * | 7/1995 |
| JP | 62-006802 | * | 1/1987 |
| JP | 63-291704 | * | 1/1988 |
| JP | H06-2442 | * | 1/1994 |
| JP | 07-001919 | * | 1/1995 |
| JP | 2006-347468 A | | 12/2006 |
| JP | 2007-050775 | * | 3/2007 |
| JP | 2010-274800 | | 12/2010 |
| JP | 2010-274800 A | | 12/2010 |

* cited by examiner

*Primary Examiner* — Steven D Maki
*Assistant Examiner* — Robert Dye
(74) *Attorney, Agent, or Firm* — Thorpe North & Western (57) ABSTRACT

A tread portion includes land portions partitioned by circumferential grooves extending in a tire circumferential direction and lateral grooves extending in a tire width direction. At least one land portion comprises an annular sipe. A surface of a portion of the land portion surrounded by the annular sipe includes at least one inner side inclining face that inclines toward the annular sipe. A surface of a portion of the land portion along a periphery of the annular sipe includes at least one outer side inclining face that inclines toward the annular sipe. The inner side inclining face and the outer side inclining face are disposed so as not to be opposite each other. A step is formed between a first edge of the annular sipe of the inner side inclining face or the outer side inclining face and a second edge of the annular sipe opposing the first edge.

20 Claims, 10 Drawing Sheets

PNEUMATIC TIRE

PRIORITY CLAIM

Priority is claimed to Japan Patent Application Serial No. 2011-186061 filed on Aug. 29, 2011.

BACKGROUND

1. Technical Field

The present technology relates to a pneumatic tire by which driving performance, braking performance, and turning performance on snowy and icy roads are enhanced to or beyond conventional levels.

2. Related Art

Figure 11:
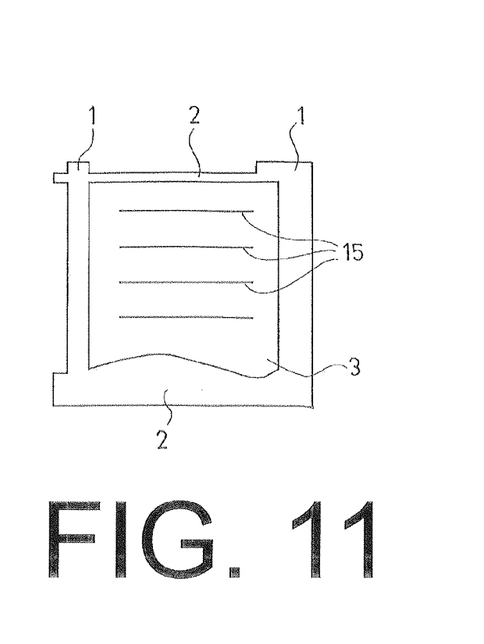
FIG. 11 is a development view of a pneumatic tire of Comparative Example 2, corresponding to FIG. 6.
Figure 12:
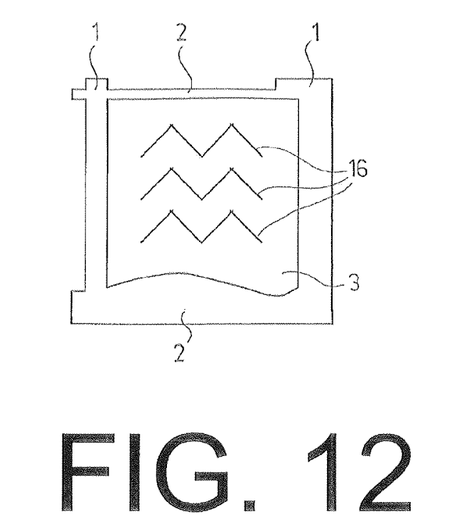
FIG. 12 is a development view of a pneumatic tire of Comparative Example 3, corresponding to FIG. 6.

Superior driving performance, braking performance, and turning performance or similar steering stability when traveling on snowy and icy roads is necessary for studless tires such as winter tires and all-season tires used for traveling on snowy and icy roads. Conventionally, as illustrated in FIGS. 11 and 12, a land portion 3 formed from a block or a rib partitioned by circumferential grooves 1 and lateral grooves 2 including lug grooves is provided in a tread portion. A plurality of sipes 15 and 16 are formed in this land portion 3 thereby increasing pliability of the land portion and increasing actual ground contact area. Moreover, steering stability on snow (performance on snow) is ensured due to the biting action by the edges of the sipes 15 and 16. This performance on snow can be enhanced by increasing the snow traction component by adjusting the length, number, and the like of the sipes 15 and 16. However, with such conventional sipes, while high traction in the tire circumferential direction can be obtained, traction in the tire width direction declines and steering stability on snow and ice when turning cannot be sufficiently obtained.

Figure 13:
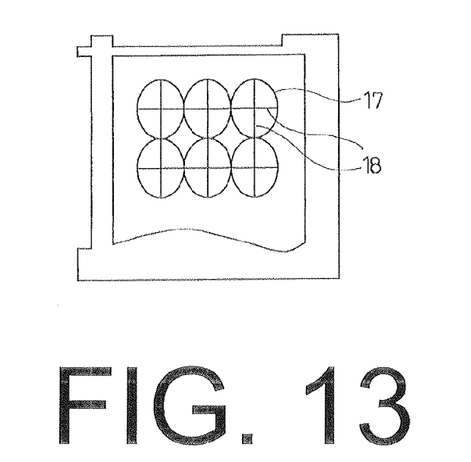
FIG. 13 is a development view of a pneumatic tire of Comparative Example 4, corresponding to FIG. 6.
Figure 14:
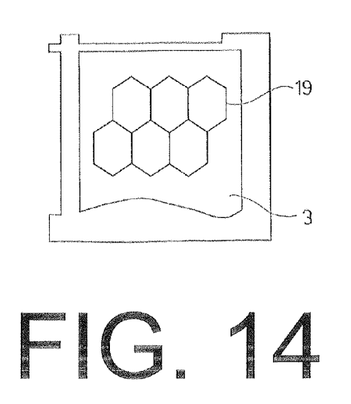
FIG. 14 is a development view of a pneumatic tire of Comparative Example 5, corresponding to FIG. 6.

In response, Japanese Unexamined Patent Application Publication No. 2006-347468A and Japanese Unexamined Patent Application Publication No. 2010-274800A propose, as illustrated in FIGS. 13 and 14, disposing a sipe that is a combination of a round annular sipe 17 and a cross-shaped sipe 18, and a honeycomb shaped sipe 19 having collectively arranged hexagonal annular sipes. Compared to the conventional sipes 15 and 16, the sipes described in Japanese Unexamined Patent Application Publication No. 2006-347468A or Japanese Unexamined Patent Application Publication No. 2010-274800A function to enhance driving performance, braking performance, turning performance and similar steering stability when traveling on snowy and icy roads. However, these improvement effects are not always sufficient and further enhancements in performance on snow and ice is needed.

SUMMARY

The present technology provides a pneumatic tire by which driving performance, braking performance, and turning performance on snowy and icy roads are enhanced to or beyond conventional levels. A pneumatic tire of the present technology includes, in a tread portion, a plurality of land portions partitioned by a plurality of circumferential grooves extending in a tire circumferential direction and a plurality of lateral grooves extending in a tire width direction. In this pneumatic tire, at least one of the land portions includes an annular sipe. A surface of a portion of the land portion surrounded by the annular sipe includes at least one inner side inclining face that inclines toward the annular sipe; and a surface of a portion of the land portion along a periphery of the annular sipe includes at least one outer side inclining face that inclines toward the annular sipe. The inner side inclining face and the outer side inclining face are disposed so as not to be opposite each other; and a step is formed between a first edge of the annular sipe of the inner side inclining face or the outer side inclining face and a second edge of the annular sipe opposing the first edge.

With the pneumatic tire of the present technology, the annular sipe is disposed in the land portion of the tread portion. The land portion surrounded by the annular sipe is constituted by a region having a height that is the same as that of the tread surface and an inner side inclining face that is configured so as to descend towards the annular sipe. The land portion along the periphery of the annular sipe is constituted by a region having a height that is the same as that of the tread surface and an outer side inclining face that is configured so as to descend towards the annular sipe. Moreover, the inner side inclining face and the outer side inclining face are displaced and disposed so as not to be opposite each other. Therefore, a step is formed between an edge of the annular sipe of the inner side inclining face and an opposing edge of the annular sipe of the outer side land portion; and a step is formed between an edge of the annular sipe of the outer side inclining face and an opposing edge of the annular sipe of the inner side land portion. As a result of the biting action by these steps, the snow traction components in the tire circumferential direction and the width direction can be increased, and driving performance, braking performance, and turning performance on snowy and icy roads can be further enhanced.

With the pneumatic tire of the present technology, the inner side inclining face or the outer side inclining face is preferably disposed alternately throughout the entire circumference of the annular sipe. Thereby, the snow traction components in the tire circumferential direction and the width direction can be further increased.

A length in the tire circumferential direction of the annular sipe is preferably from 3 to 10 mm and/or a length in the tire width direction of the annular sipe is preferably from 3 to 10 mm. Thereby, the biting action by the step formed between the edges of the annular sipe and by the edges on both sides of the inner side inclining face can be increased.

A width of the outer side inclining face is preferably not more than 10 mm. Thereby, the biting action by the step formed between the edges of the annular sipe and by the edges on both sides of the outer side inclining face can be increased.

A depth of the annular sipe is preferably not more than 30% of a depth of the circumferential grooves, and a height of the step is not more than 50% of the depth of the annular sipe. Thereby, the biting action by the step and the edges on both sides of the inclining faces can be ensured even when the surface of the tread portion has worn to a certain degree and great traction components can be obtained.

An inclination angle of the inclining face with respect to a tread surface is preferably not more than 45°. Thereby, strength of the inner side land portion adjacent to the inner side inclining face and strength of the outer side land portion adjacent to the outer side inclining face can be ensured and tire durability can be maintained.

Preferably, a plurality of annular sipes is formed in one of the land portions, and orientations of the inner side inclining faces of the annular sipes are different from each other. Thereby, performance on snow and ice in all directions including the tire circumferential direction and the tire width direction can be enhanced.

DETAILED DESCRIPTION

Figure 1:
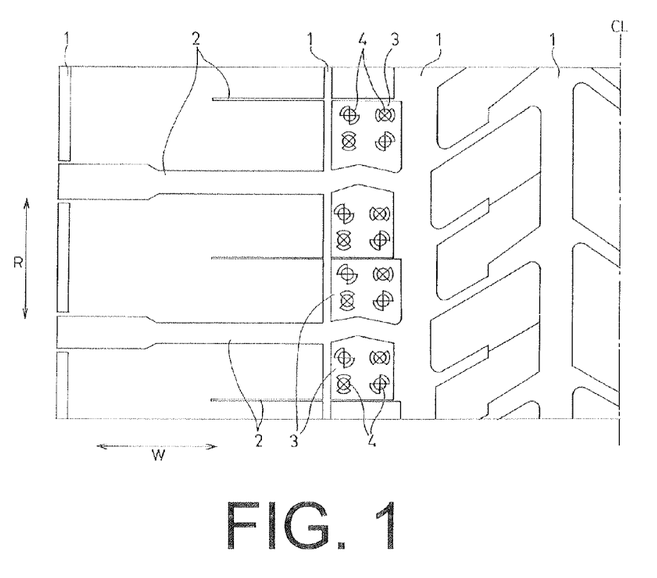
FIG. 1 is a development view of a tread pattern that depicts an example of an embodiment of a pneumatic tire of the present technology.

FIG. 1 illustrates an example of an embodiment of a pneumatic tire of the present technology and is an explanatory drawing depicting a developed portion of a tread pattern. Note that a tire circumferential direction is indicated by the arrow "R" and a tire width direction is indicated by the arrow "W".

A tread portion of the pneumatic tire includes a plurality of land portions 3 partitioned by a plurality of circumferential grooves 1 extending in the tire circumferential direction and a plurality of lateral grooves 2 extending in the tire width direction. The land portions 3 are basically blocks, but may also be ribs that include narrow, shallow lateral grooves.

An annular sipe 4 is disposed in at least one of the land portions 3. In the example illustrated in FIG. 1, four of the annular sipes 4 are disposed in each block of the row of blocks, but the selection of the land portions in which the annular sipe is disposed and the number of annular sipes disposed are not limited to this example. That is, the annular sipe 4 may be disposed in all of the blocks formed in the tread portion, or a single row of blocks may include a combination of blocks that have the annular sipe 4 and blocks that do not have the annular sipe 4. The manner in which the annular sipe 4 is disposed is not particularly limited provided that adjacent annular sipes do not overlap each other, and may be disposed in a single row or a plurality of rows, or in a random manner. Additionally, the number of annular sipes disposed per land portion that includes the annular sipe 4 is preferably one or greater, but the greater the number of disposed annular sipes, the better.

Figure 2:
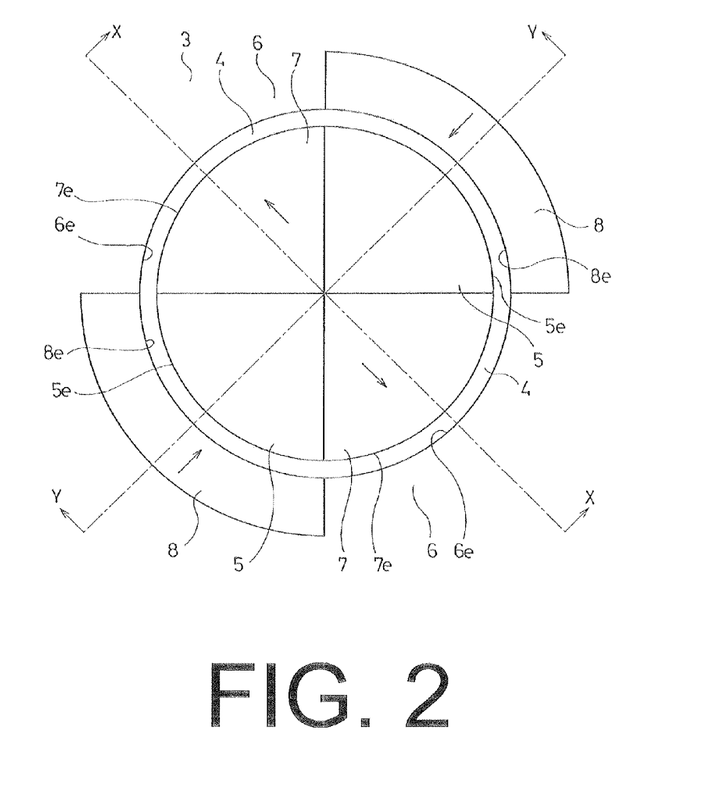
FIG. 2 is a plan view illustrating an enlarged example of an annular sipe of a pneumatic tire of the present technology.
Figure 3A:
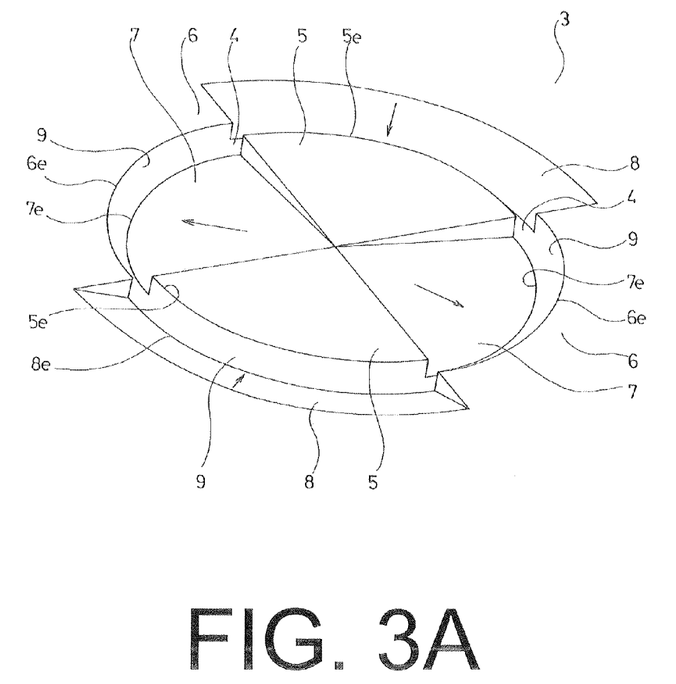
FIG. 3A is a perspective view of the annular sipe depicted in FIG. 2.
Figure 3B:
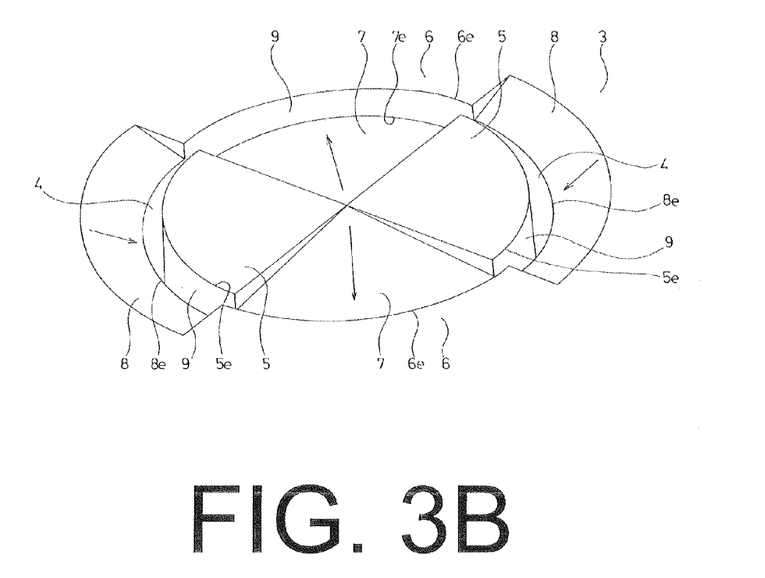
FIG. 3B is a perspective view of the annular sipe depicted in FIG. 2, shown from a different perspective than that of FIG. 3A.
Figure 4:
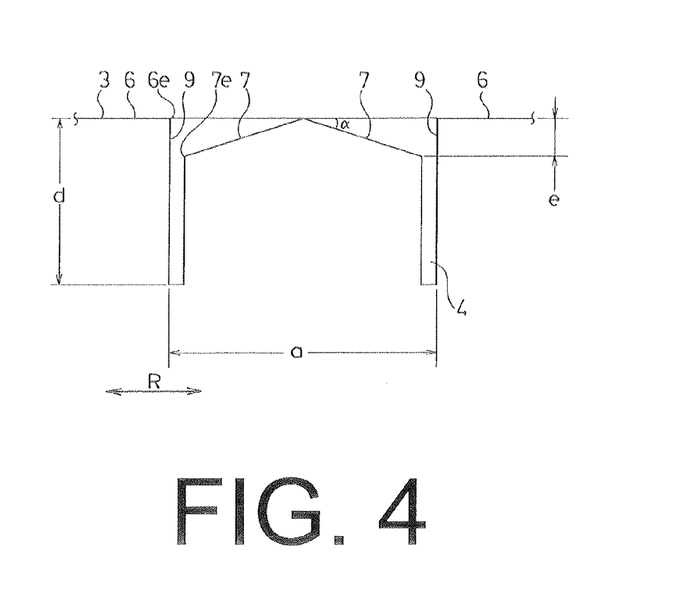
FIG. 4 is a cross-sectional view taken along the line X-X of FIG. 2.
Figure 5:
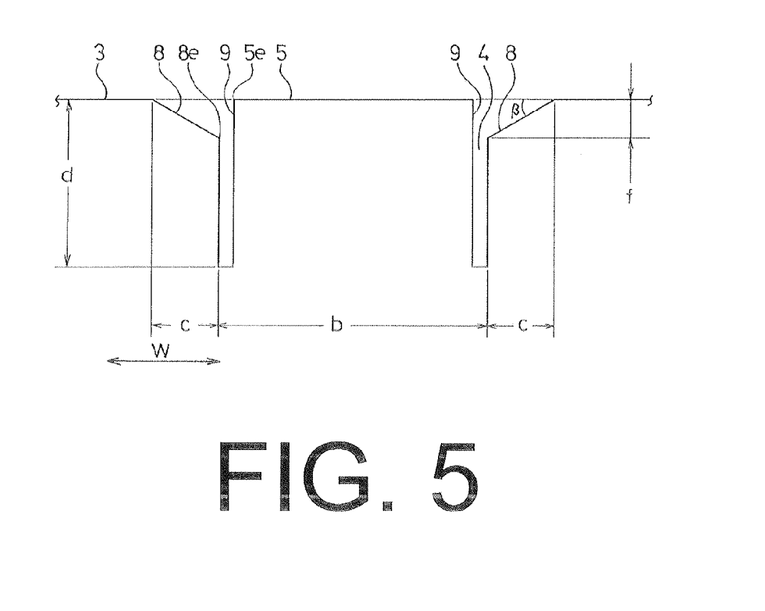
FIG. 5 is a cross-sectional view taken along the line Y-Y of FIG. 2.

FIG. 2 is a plan view illustrating an enlarged example of the annular sipe 4. FIGS. 3A and 3B are each perspective views illustrating the annular sipe 4 of FIG. 2 from different perspectives. FIG. 4 schematically illustrates a cross-sectional view taken along the line X-X of FIG. 2, and FIG. 5 schematically illustrates a cross-sectional view taken along the line Y-Y of FIG. 2.

In FIGS. 2, 3A, and 3B, a land portion 5 surrounded by the circular (plan view) annular sipe 4, that is, an inner side land portion 5 of the annular sipe 4, is constituted by a region having a height that is the same as that of the tread surface and an inner side inclining face 7, where the surface of the land portion is inclined so as to descend from a center of the land portion 5 toward the edge of the annular sipe 4. At least one and preferably two or more of the inner side inclining face 7 are formed per each annular sipe 4. Additionally, a land portion 6 along the periphery of the annular sipe 4, that is, an outer side land portion 6 of the annular sipe 4, is constituted by a region having a height that is the same as that of the tread surface and an outer side inclining face 8, where the surface of the land portion is inclined so as to descend from an outer side of the land portion 6 toward the edge of the annular sipe 4. At least one and preferably two or more of the outer side inclining face 8 are formed per each annular sipe 4.

In the present technology, the inner side inclining face 7 and the outer side inclining face 8 are disposed so as not to oppose each other, that is, offset in the circumferential direction of the annular sipe 4. Because the inner side inclining face 7 and the outer side inclining face 8 are disposed so as not to be opposite each other, a step 9 is formed between an edge 7e of the annular sipe 4 of the inner side inclining face 7 and an edge 6e of the annular sipe 4 of the outer side land portion 6 opposing the edge 7e; and a step 9 is formed between an edge 8e of the annular sipe 4 of the outer side inclining face 8 and an edge 5e of the annular sipe 4 of the inner side land portion 5 opposing the edge 8e. By forming the step 9 on the circumference of the annular sipe 4 as described above, the biting action of the annular sipe 4 can be increased. As a result, the snow traction components in the tire circumferential direction R and the width direction W can be increased, and driving performance, braking performance, and turning performance on snowy and icy roads can be further enhanced. Note that in FIGS. 2, 3A, and 3B, the arrows on the inner side inclining face 7 and the outer side inclining face 8 indicate the direction of inclination for each inclining face. Additionally, the "step 9" refers to a difference between a height of the inner side edge 5e or 7e of the annular sipe 4 and a height of the respectively opposing outer side edge 8e or 6e. Thus, as in Japanese Unexamined Patent Application Publication No. 2006-347468A or Japanese Unexamined Patent Application Publication No. 2010-274800A described above, the step does not exist when the height of the inner side edge and the height of the outer side edge of the annular sipe 4 are the same.

In the pneumatic tire of the present technology, one or more of each of the inner side inclining face 7 and the outer side inclining face 8 may be disposed on the circumference of the annular sipe 4 and, preferably, from two to four of each are disposed. As a result, the orientation of the step 9 and the orientations of the edges formed at both sides of the inner side inclining face 7 and the outer side inclining face 8 will face all directions including the tire circumferential direction and the tire width direction. Therefore, snow traction components when traveling straight and when turning can be increased and performance on snowy and icy roads can be further enhanced.

Additionally, preferably the inner side inclining face 7 or the outer side inclining face 8 is disposed on the circumference of the annular sipe 4 throughout an entire circumference thereof and the step 9 is formed throughout the entire circumference of the annular sipe 4. That is, preferably an entirety of the outer side land portion 6 around the periphery of the annular sipe 4, with the exception of the outer side inclining face 8, opposes the inner side inclining face 7 and an entirety of the inner side land portion 5, with the exception of the inner side inclining face 7, opposes the outer side inclining face 8. As a result, the biting action of the step 9 can be exerted throughout the entire circumference of the annular sipe 4 and, therefore, snow traction components in all directions including the tire circumferential direction and the width direction can be further increased.

In the present technology, a total of a circumferential length of the annular sipe 4 contacting the inner side inclining face 7 and a total of a circumferential length of the annular sipe 4 contacting the outer side inclining face 8 are preferably substantially the same. Additionally, a circumferential length of the annular sipe 4 contacting one of the inner side inclining faces 7 and a circumferential length of the annular sipe 4 contacting the adjacent outer side inclining face 8 are preferably substantially the same. As a result, the biting action by the step can be exerted in all directions.

In FIGS. 4 and 5, a length a of the annular sipe 4 in the tire circumferential direction R is preferably from 3 to 10 mm and more preferably from 5 to 7 mm. Additionally, a length b of the annular sipe 4 in the tire width direction W is preferably from 3 to 10 mm and more preferably from 5 to 7 mm. As a result, the biting action by the step 9 opposite the inner side inclining face 7 and the biting action by the edges formed on both sides of the inner side inclining face 7 can be further increased. Note that the lengths a and b of the annular sipe 4 are maximum values of distances between the outer side edges of the annular sipe 4.

Additionally, a width c of the outer side inclining face 8 is preferably not more than 10 mm and more preferably is from 3 to 6 mm. As a result, the biting action by the step 9 opposite the outer side inclining face 8 and the biting action by the edges formed on both sides of the outer side inclining face 8 can be further increased.

In the present technology, a width of the annular sipe 4 is preferably from 0.5 to 2.0 mm and is more preferably from 0.8 to 1.5 mm. When the width of the annular sipe 4 is within this range, the land portions can be made appropriately pliable while maintaining the strength thereof, and the biting action of the sipe edge can be increased. Note that the width of the annular sipe 4 is the distance between the inner side edge and the outer side edge of the annular sipe 4.

Additionally, a depth d of the annular sipe 4 is preferably not more than 50%, more preferably not more than 30%, and even more preferably from 10 to 30% of a depth of the circumferential grooves 1. Furthermore, heights e and f of the step 9 are preferably not more than 50% and are more preferably from 20 to 40% of the depth d of the annular sipe 4. By configuring the depth d of the annular sipe 4 and the heights e and f of the step 9 as described above, biting action by the step 9 and the edges on both sides of the inner side inclining face 7 and the outer side inclining face 8 can be ensured even when the surface of the tread portion has worn to a certain degree, and great traction components can be obtained. At the same time, the strength of the inner side land portion 5 can be ensured and tire durability can be maintained.

An inclination angle α of the inner side inclining face 7 with respect to the tread surface and an inclination angle β of the outer side inclining face 8 with respect to the tread surface are preferably not more than 45° and more preferably are from 15 to 35°. When the inclination angles α and β are within the range described above, strength of the inner side land portion adjacent to the inner side inclining face 7 and strength of the outer side land portion adjacent to the outer side inclining face 8 can be ensured and tire durability can be maintained.

In the present technology, preferably, a plurality of annular sipes is disposed and formed in one of the land portions, and orientations of the inner side inclining face and/or the outer side inclining face of the annular sipes 4 are different from each other between adjacent annular sipes 4. As a result, performance on snow and ice in all directions including the tire circumferential direction and the tire width direction can be enhanced.

Figure 6:
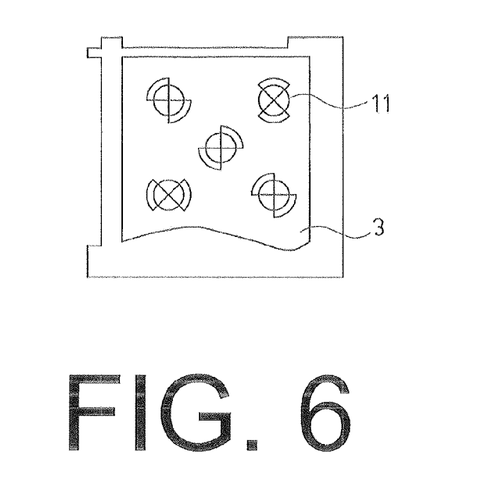
FIG. 6 is a development view illustrating an enlarged example of another land portion of an embodiment of the pneumatic tire of the present technology.

A plan view shape of the annular sipe 4 is not particularly limited and can, for example, be a circular annular sipe 4 as in FIG. 6; an elliptical or polygonal shape (e.g. a rectangular annular sipe 4 as in FIG. 7 or a hexagonal annular sipe 4 as in FIG. 8); a track shape or crescent shape (e.g. a crescent shape annular sipe 4 as in FIG. 9); or a similar closed shape formed from a combination of straight lines and/or circular arcs or elliptical arcs. The shape of the annular sipe 4 is preferably circular, elliptical, triangular, rectangular, pentagonal, or hexagonal.

The present technology is further explained below by examples. However, the scope of the present technology is not limited to these examples.

EXAMPLES

Nine types of pneumatic tires (Working Examples 1 to 4 and Comparative Examples 1 to 5) were fabricated having a tire size of 195/65R15 and the tread pattern (except the sipes) illustrated in the developed drawing of FIG. 1 in common. The shape of the sipe disposed in the land portion, the length a in the tire circumferential direction of the sipe, the length b in the tire width direction of the sipe, and the number of sipes per land portion were varied as shown in Table 1. Note that sipes were not formed in the land portions of the pneumatic tire of Comparative Example 1.

The obtained nine types of pneumatic tires were assembled on rims (size: 15×6J), inflated to an air pressure of 230 kPa, and mounted on a 2.0 L passenger car (made in Japan). Then, driving performance, turning performance and braking performance were each measured according to the methods described below.

Driving Performance

Driving performance was evaluated as the amount of time required to travel 100 m from start to finish from a stopped state on a (200 m) straight road covered with snow and ice. The inverse of the required time for each of the obtained results was calculated and indexed with the pneumatic tire of Comparative Example 3 being assigned an index value of 100. The results are shown in Table 1. Larger index values indicate superior driving performance.

Turning Performance

Turning performance was evaluated as a feeling evaluation by a test driver when cornering and lane changing when traveling on a circuit course (1 circuit=3 km) covered with snow and ice. The obtained results were indexed with the pneumatic tire of Comparative Example 3 being assigned an index value of 100. The results are shown in Table 1. Larger index values indicate superior turning performance.

Braking Performance

Braking performance was evaluated as the braking distance required to brake from a speed of 50 km/hr to 0 km/hr when traveling on a (200 m) straight road covered with snow and ice. The inverse of the braking distance for each of the obtained results was calculated and indexed with the pneumatic tire of Comparative Example 3 being assigned an index value of 100. The results are shown in Table 1. Larger index values indicate superior braking performance.

TABLE 1

Figure 10:
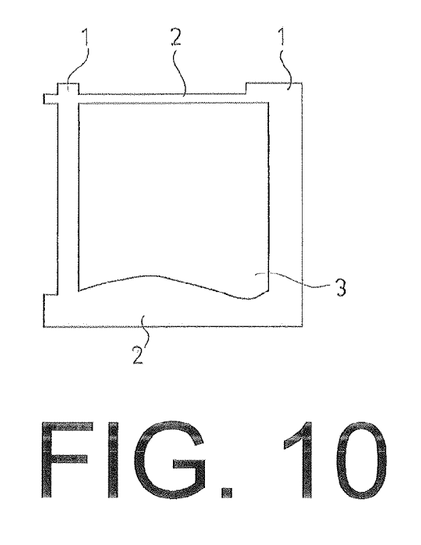
FIG. 10 is a development view of a pneumatic tire of Comparative Example 1, corresponding to FIG. 6.

|  |  | Comparative Example 1 | Comparative Example 2 | Comparative Example 3 |
|---|---|---|---|---|
| Sipe shape |  | FIG. 10 | FIG. 11 | FIG. 12 |
| Number of sipes | (number) | None | 5 | 4 |
| Presence/absence of inclination |  | — | Absent | Absent |
| Length a in the circumferential direction | (mm) | — | 1 | 3 |
| Length b in the width direction | (mm) | — | 6 | 6 |
| Driving performance | (index) | 90 | 100 | 100 |
| Turning performance | (index) | 90 | 95 | 100 |
| Braking performance | (index) | 90 | 100 | 100 |

|  |  | Comparative Example 4 | Comparative Example 5 |
|---|---|---|---|
| Sipe shape |  | FIG. 13 | FIG. 14 |
| Number of sipes | (number) | 6 | 6 |
| Presence/absence of inclination |  | Absent | Absent |
| Length a in the circumferential direction | (mm) | 3 | 4 |
| Length b in the width direction | (mm) | 3 | 3 |
| Driving performance | (index) | 110 | 105 |
| Turning performance | (index) | 110 | 105 |
| Braking performance | (index) | 110 | 105 |

Figure 7:
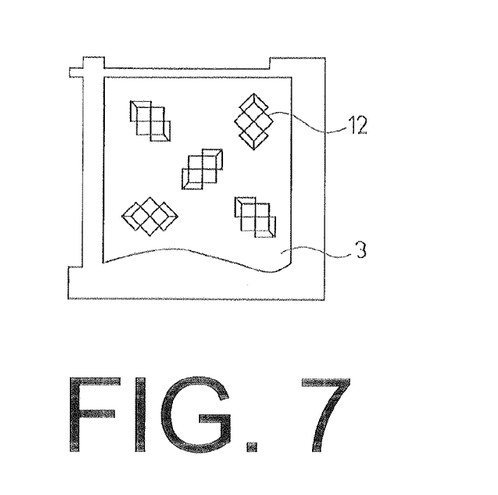
FIG. 7 is a development view corresponding to FIG. 6 that illustrates yet another example of the embodiment of the pneumatic tire of the present technology.
Figure 8:
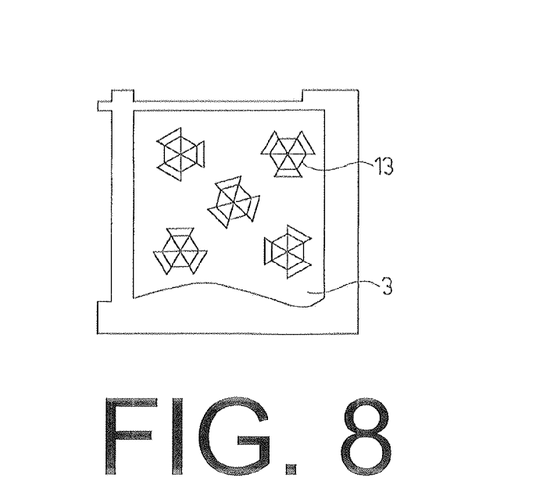
FIG. 8 is a development view corresponding to FIG. 6 that illustrates yet another example of the embodiment of the pneumatic tire of the present technology.
Figure 9:
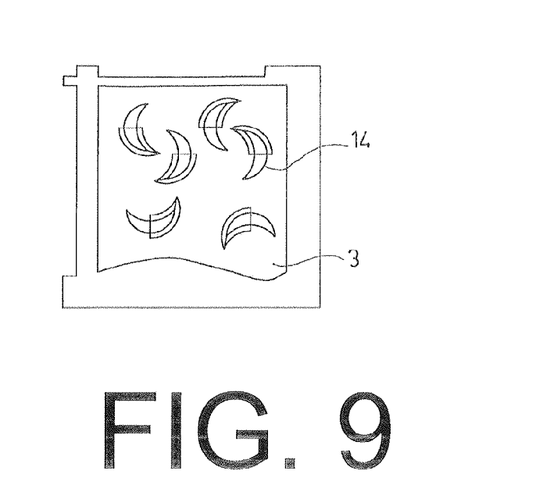
FIG. 9 is a development view corresponding to FIG. 6 that illustrates yet another example of the embodiment of the pneumatic tire of the present technology.

|  |  | Working Example 1 | Working Example 2 | Working Example 3 | Working Example 4 |
|---|---|---|---|---|---|
| Sipe shape |  | FIG. 6 | FIG. 7 | FIG. 8 | FIG. 9 |
| Number of sipes | (number) | 5 | 5 | 5 | 5 |
| Presence/absence of inclination |  | Present | Present | Present | Present |
| Length a in the circumferential direction | (mm) | 4 | 4 | 5 | 5.5 |
| Length b in the width direction | (mm) | 4 | 4 | 4 | 3 |
| Driving performance | (index) | 115 | 118 | 120 | 112 |
| Turning performance | (index) | 115 | 112 | 115 | 112 |
| Braking performance | (index) | 115 | 118 | 120 | 112 |

As is clear from Table 1, the pneumatic tires of Working Examples 1 to 4 displayed driving performance, turning performance, and braking performance that were enhanced to or beyond conventional levels (those of Conventional Examples 1 to 5).

What is claimed is:

1. A pneumatic tire comprising, in a tread portion, a plurality of land portions partitioned by a plurality of circumferential grooves extending in a tire circumferential direction and a plurality of lateral grooves extending in a tire width direction; wherein at least one of the land portions comprises an annular sipe; a surface of a portion of the land portion surrounded by the annular sipe comprises at least one inner side inclining face that inclines toward the annular sipe; a surface of a portion of the land portion along a periphery of the annular sipe comprises at least one outer side inclining face that inclines toward the annular sipe; the inner side inclining face and the outer side inclining face are disposed so as not to be opposite each other; and a step is formed between a first edge of the annular sipe of the inner side inclining face or the outer side inclining face and a second edge of the annular sipe opposing the first edge.

2. The pneumatic tire according to claim 1, wherein the inner side inclining face or the outer side inclining face is disposed throughout the entire circumference of the annular sipe.

3. The pneumatic tire according to claim 1, wherein a length of the annular sipe in the tire circumferential direction is from 3 to 10 mm and/or a length of the annular sipe in the tire width direction is from 3 to 10 mm.

4. The pneumatic tire according to claim 1, wherein a width of the outer side inclining face is not more than 10 mm.

5. The pneumatic tire according to claim 1, wherein a depth of the annular sipe is not more than 30% of a depth of the circumferential grooves.

6. The pneumatic tire according to claim 1, wherein a height of the step is not more than 50% of the depth of the annular sipe.

7. The pneumatic tire according to claim 1, wherein inclination angles of the inner side and outer side inclining faces with respect to a tread surface are not more than 45°.

8. The pneumatic tire according to claim 1, wherein a plurality of annular sipes is formed in one of the land portions, and orientations of the inner side inclining faces of the annular sipes are different from each other.

9. The pneumatic tire according to claim 1, wherein a plan view shape of the annular sipe is selected from the group consisting of circular, elliptical, triangular, rectangular, pentagonal, and hexagonal.

10. The pneumatic tire according to claim 1, wherein an inclination angle of the inner side inclining face with respect to the tread surface and an inclination angle of the outer side inclining face with respect to the tread surface are from 15° to 35°.

11. The pneumatic tire according to claim 1, wherein a depth of the annular sipe is not more than 50% of a depth of the circumferential grooves.

12. The pneumatic tire according to claim 11, wherein the depth of the annular sipe is from 10 to 30% of a depth of the circumferential grooves.

13. The pneumatic tire according to claim 1, wherein a height of the step is from 20 to 40% of a depth of the annular sipe.

14. The pneumatic tire according to claim 1, wherein a width of the annular sipe is from 0.8 to 1.5 mm.

15. The pneumatic tire according to claim 1, wherein a width of the outer side inclining face is from 3 to 6 mm.

16. The pneumatic tire according to claim 1, wherein a length a of the annular sipe in the tire circumferential direction is from 5 to 7 mm, and/or a length of the annular sipe in the tire width direction is from 5 to 7 mm.

17. The pneumatic tire according to claim 1, wherein a total of the circumferential length of the annular sipe contacting the inner side inclining face and a total of the circumferential length of the annular sipe contacting the outer side inclining face are substantially the same.

18. The pneumatic tire according to claim 1, wherein the inner side inclining face or the outer side inclining face is disposed on the circumference of the annular sipe throughout an entirety of the circumference of the annular sipe and the step is formed throughout the entire circumference of the annular sipe.

19. The pneumatic tire according to claim 1, wherein at least two of the inner side inclining face or at least two of the outer side inclining face are formed per each annular sipe.

20. The pneumatic tire according to claim 1, wherein from two to four of each of the inner side inclining face and the outer side inclining face are disposed on the circumference of the annular sipe.

\* \* \* \* \*